(12) United States Patent
Cates et al.

(10) Patent No.: US 11,313,554 B2
(45) Date of Patent: Apr. 26, 2022

(54) FLUIDIC BURNER WITH HEAT STABILITY

(71) Applicant: PRAXAIR TECHNOLOGY, INC., Danbury, CT (US)

(72) Inventors: Jesse E Cates, Brownburg, IN (US); Bryan R Bielec, Hamburg, NY (US); Larry E Cates, Brownburg, IN (US); Bradley D Damstedt, Williamsville, NY (US); Megha Jampani, Depew, NY (US)

(73) Assignee: Praxair Technology, Inc., Danbury, CT (US)

( * ) Notice: Subject to any disclaimer, the term of this patent is extended or adjusted under 35 U.S.C. 154(b) by 206 days.

(21) Appl. No.: 16/466,183

(22) PCT Filed: Dec. 18, 2017

(86) PCT No.: PCT/US2017/066961
§ 371 (c)(1),
(2) Date: Jun. 3, 2019

(87) PCT Pub. No.: WO2018/118752
PCT Pub. Date: Jun. 28, 2018

(65) Prior Publication Data
US 2020/0080720 A1 Mar. 12, 2020

Related U.S. Application Data

(60) Provisional application No. 62/435,983, filed on Dec. 19, 2016.

(51) Int. Cl.
| | | |
|---|---|---|
| F23D 14/22 | (2006.01) | |
| F23D 14/32 | (2006.01) | |
| F23D 14/56 | (2006.01) | |
| F23D 14/58 | (2006.01) | |
| F23D 14/78 | (2006.01) | |

(Continued)

(52) U.S. Cl.
CPC ............ *F23D 14/22* (2013.01); *F23D 14/32* (2013.01); *F23D 14/56* (2013.01); *F23D 14/58* (2013.01); *F23D 14/78* (2013.01); *F23D 14/84* (2013.01); *F23L 7/007* (2013.01); *C03B 5/2353* (2013.01); *C21C 5/565* (2013.01);

(Continued)

(58) Field of Classification Search
CPC ....................................................... F23D 14/22
See application file for complete search history.

(56) References Cited

U.S. PATENT DOCUMENTS

| | | |
|---|---|---|
| 5,110,285 A | 5/1992 | Snyder et al. |
| 5,814,125 A | 9/1998 | Anderson et al. |

(Continued)

FOREIGN PATENT DOCUMENTS

| | | |
|---|---|---|
| EP | 0491325 A2 | 6/1992 |
| EP | 0545357 A1 | 6/1993 |

(Continued)

*Primary Examiner* — Jason Lau
(74) *Attorney, Agent, or Firm* — Donald T. Black (57) ABSTRACT

A burner comprises a central passageway and outlets for fuel and for stabilizing oxidant arranged peripherally around the central passageway, and comprises outlets within the burner through which biasing gas, such as gas comprising oxygen, can be injected to enable control of the direction of the flame that is generated by combustion of the fuel and the oxidant at the face of the burner.

20 Claims, 4 Drawing Sheets

(51) Int. Cl.
*F23D 14/84* (2006.01)
*F23L 7/00* (2006.01)
C03B 5/235 (2006.01)
C21C 5/56 (2006.01)

(52) U.S. Cl.
CPC .. *F23D 2200/00* (2013.01); *F23D 2203/1017* (2013.01); *F23D 2214/00* (2013.01)

(56) References Cited

U.S. PATENT DOCUMENTS

| | | | | |
|---|---|---|---|---|
| 6,926,516 | B1* | 8/2005 | Sudo | F23D 14/58 |
| | | | | 431/8 |
| 2007/0012139 | A1 | 1/2007 | Mahoney et al. | |
| 2011/0127702 | A1 | 6/2011 | Gautam et al. | |
| 2012/0031098 | A1* | 2/2012 | Ginessin | F23R 3/283 |
| | | | | 60/740 |

FOREIGN PATENT DOCUMENTS

| | | |
|---|---|---|
| JP | 2004020050 A | 1/2004 |
| JP | 2005113200 A | 4/2005 |
| JP | 2013079753 A | 5/2013 |
| WO | 2007/008973 A2 | 1/2007 |

* cited by examiner

FLUIDIC BURNER WITH HEAT STABILITY

RELATED APPLICATIONS

This application claims the benefit of International Application No. PCT/US17/66961, filed on Dec. 18, 2017, which claimed the benefit of U.S. Provisional Application Ser. No. 62/435,983, filed on Dec. 19, 2016, which are incorporated herein by reference.

FIELD OF THE INVENTION

The present invention relates to burners suitable for combusting fuel and gaseous oxidant in a combustion zone.

BACKGROUND OF THE INVENTION

A conventional burner employed to provide heat to, for example, a furnace is fixed in place in a furnace wall and directs the flame or combustion reaction emanating from the burner to a fixed point in the combustion zone within the furnace. Many burners have controls for changing the shape of the flame from, for example, a long, thin flame to a short, bushy flame in order to better match the heating provided by the burner to the demand required by the furnace charge. However, it is sometimes necessary or desirable to change the direction of the burner flame. For example, in the melting of scrap metal it is desirable to change the direction of the flame to provide heat directly to the unmelted scrap rather than to wait for conduction and convection currents to provide heat to the unmelted scrap from the area within the combustion zone where the flame is directed.

U.S. Pat. No. 5,110,285 discloses a way of changing the flame direction of a burner. However, operation in accordance with the teachings of this patent risks encountering operational drawbacks, such as overheating of the burner nozzle, and/or plugging of the orifices in the end of the burner with combustion byproducts from the furnace.

The present invention avoids these risks with a combination of features that permit efficient operation while retaining the advantages of the ability to change the flame direction of the burner.

BRIEF SUMMARY OF THE INVENTION

One aspect of the present invention is a burner apparatus, comprising (A) a burner body having:
a central passageway within the burner body having an upstream end and an axially opposed downstream end which opens at a downstream end of the burner, wherein the cross-sectional diameter of the central passageway increases in the direction toward the downstream end; a plurality of first ports in the downstream end of the burner which are located substantially evenly around the downstream end of the central passageway, wherein the first ports are connected by first passageways within the body of the burner to one or more inlets through which a first fluid can be fed, and a plurality of second ports in the downstream end of the burner which are located substantially evenly around the downstream end of the central passageway, wherein the second ports are connected by second passageways within the body of the burner to one or more inlets through which a second fluid can be fed, the first and second passageways being separate from each other; wherein the first ports and the second ports are substantially uniformly distant from the central axis of the central passageway;
and wherein the central passageway, the first ports, and the second ports, are the only openings in the burner apparatus through which fluid can flow out of the downstream end of the burner apparatus;

(B) a fluidic cavity communicating at the downstream end thereof with the upstream end of the central passageway of the burner, said fluidic cavity having a diameter D at said point of communication sufficient to enable fluid passing therethrough to have a supersonic velocity, said central passageway having a length from said point of communication to its downstream end of from 2D to 9D and preferably from 3D to 9D;

(C) a plurality of biasing gas passageways through which biasing gas can be fed into the fluidic cavity in a direction substantially perpendicular to the axial centerline of the fluidic cavity, said passageways having a diameter d such that d/D is within the range of from 0.18 to 0.75, said passageways communicating with the fluidic cavity at a point within the range of from 3d/4 upstream to d/4 downstream of the point of communication between the fluidic cavity and the upstream end of the central passageway, where D and d are expressed in the same units;

and (D) a housing which surrounds the downstream end of the burner and which is open at the end of the housing that surrounds the downstream end of the burner, wherein the open end of the housing is located a distance L downstream from the downstream end of the burner, wherein L is at least 25% of the distance across the open end of the housing, wherein the portion of the housing that extends downstream of the downstream end of the burner comprises passageways therein through which coolant can flow to absorb heat generated by combustion occurring at the burner.

Another aspect of this invention comprises a method of combustion, comprising:

(A) feeding fuel out of the downstream end of a burner according to the aforesaid description, through the first ports of the burner;

(B) feeding gaseous oxidant out of the downstream end of the burner through the second ports of the burner;

(C) feeding gaseous oxidant through the fluidic cavity of the aforesaid burner and through and out of the downstream end of the central passageway of the burner, wherein the gaseous oxidant flows through the fluidic cavity at a velocity of at least 400 feet per second and preferably at least 500 feet per second to establish a reduced pressure zone adjacent a portion of the surface of the central passageway;

(D) combusting the fuel and the gaseous oxidant; and (E) periodically or continually, injecting a stream of biasing gas having a diameter d into the fluidic cavity in a direction substantially perpendicular to the flow direction of the gaseous oxidant passing through the fluidic cavity at a point within the range of from 3d/4 upstream to d/4 downstream of the point of communication between the fluidic cavity and the central passageway, where D and d are measured in the same units, thereby changing the flow direction of the gaseous oxidant passing out of the downstream end of the central passageway.

As used herein the term "combustion zone" means the volume into which gaseous fluid is passed from the outlet of the burner.

As used herein the term "substantially perpendicular" means within plus or minus 15 degrees.

As used herein, ports are "substantially evenly" located around the central passageway if the angles between each pair of adjacent radii from the central axis of the central passageway through the center of each port are each within 5 degrees of (360/N) where N is the number of ports, and are "evenly" located around the central passageway if the angles between every pair of adjacent radii are within 1 degree of (360/N). For example, if there are 12 ports, they are considered to be substantially evenly located around the central passageway if the angle between each pair of adjacent radii is from 25 degrees to 35 degrees, and evenly located if each such angle is 29 to 31 degrees.

As used herein, a group of ports being "relatively uniformly distant" from the central axis of the central passageway means that, with reference to the port whose center is closest to the central axis of the central passageway, none of the other ports in the group are completely outside of a circle whose center is on the central axis and whose radius is the distance to the outermost edge of that reference port, and a group of ports are "substantially uniformly distant" from the central axis of the central passageway if, with reference to that reference port, no portion of the other ports in the group is at all outside of a circle whose center is on the central axis and whose radius is the distance to the outermost edge of that reference port.

DETAILED DESCRIPTION OF THE INVENTION

This invention is useful in any application in which fuel and oxidant are combusted to generate heat of combustion that is used to heat, soften or melt material. Examples include incinerators, glass furnaces (in which solid glass-making material is melted), steel reheat furnaces, steelmaking electric arc furnaces, kilns for producing cement, and the like. The invention will be described in detail as follows, with reference to the drawings.

Figure 1:
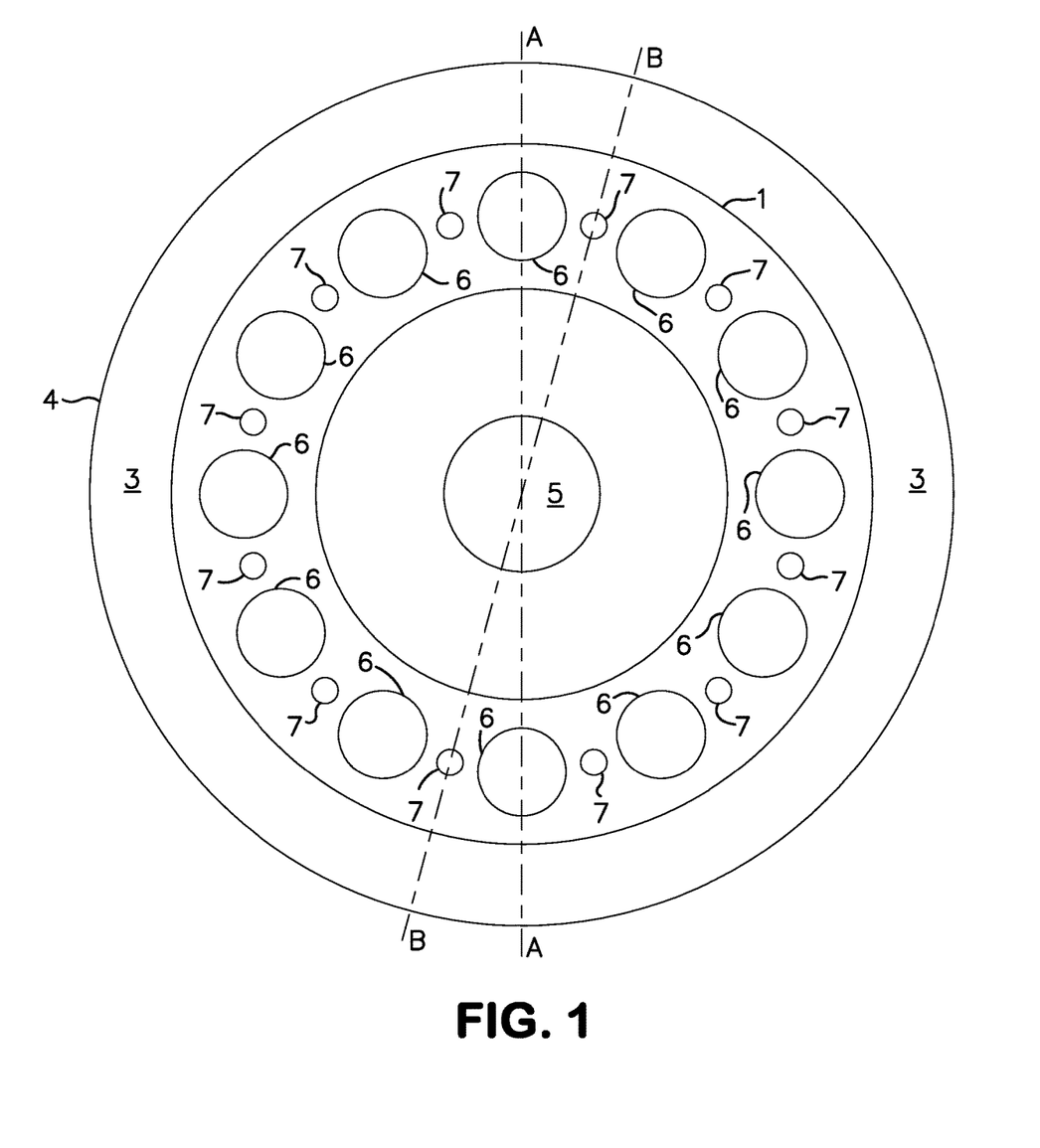
FIG. 1 is a front view of one embodiment of the burner apparatus of the present invention.

FIG. 1 depicts the downstream end of a burner apparatus of the present invention, including downstream end 2 of burner 1, and downstream end 3 of housing 4. The terms "downstream" and "upstream" are used for reference purposes to describe relative locations of components of the burner apparatus, without implying that fluid is necessarily flowing in the apparatus. Central passageway 5 is open at the downstream end 2 of burner 1 and extends into the body of burner 1. First ports 6 and second ports 7 open in the downstream end 2 of burner 1. The burner apparatus including burner 1 and housing 4 are manufactured from material that can withstand temperatures encountered in combustion of fuel in furnaces, preferably up to 500 C, such as copper alloys.

Preferably, ports 6 are substantially evenly located with respect to each other around the central axis of central passageway 5, and ports 7 are substantially evenly located with respect to each other around the central axis of central passageway 5. More preferably, all of ports 6 are evenly located around the central axis of passageway 5 with respect to each other, and all of ports 7 are evenly located around the central axis of passageway 5 with respect to each other.

Ports 6 are preferably relatively uniformly distant, and more preferably they are substantially uniformly distant, from the central axis of central passageway 5 with respect to each other. Ports 7 are preferably relatively uniformly distant, and more preferably they are substantially uniformly distant, from the central axis of central passageway 5 with respect to each other. Even more preferably, all of the first ports and all of the second ports are substantially uniformly distant from the central axis of passageway 5, considering all of said ports 6 and 7 as one group.

Anywhere from 4 to 20 first ports may be present, preferably 8 to 14. Anywhere from 4 to 20 second ports may be present, preferably 8 to 14. FIG. 1 depicts a preferred arrangement of ports in which one second port is located between each pair of first ports. Also preferred are arrangements in which all the first ports are the same distance from the central axis of central passageway 5 with respect to each other, and all the second ports are the same distance from the central axis of central passageway 5 with respect to each other. Also preferred are arrangements in which the centers of all of the first ports, and the centers of all of the second ports, are all the same distance from the center axis of passageway 5. This arrangement is shown in FIG. 1. The axes of the first and second ports should be oriented so that gas flows out of the ports into combustion zone 23, preferably parallel to the axis of central passageway 5 or at an angle of up to 10 degrees or even up to 45 degrees relative to the axis of central passageway 5.

The only openings or spaces from which fluid (meaning gas, liquid, solids, and any combinations thereof) can pass from out of the burner apparatus of the present invention into combustion zone 23 are the central passageway 5, the first ports 6, and the second ports 7. That is, there is no other gap or opening between the outer surface of burner 1 and the inner surface of housing 4.

Figure 2A:
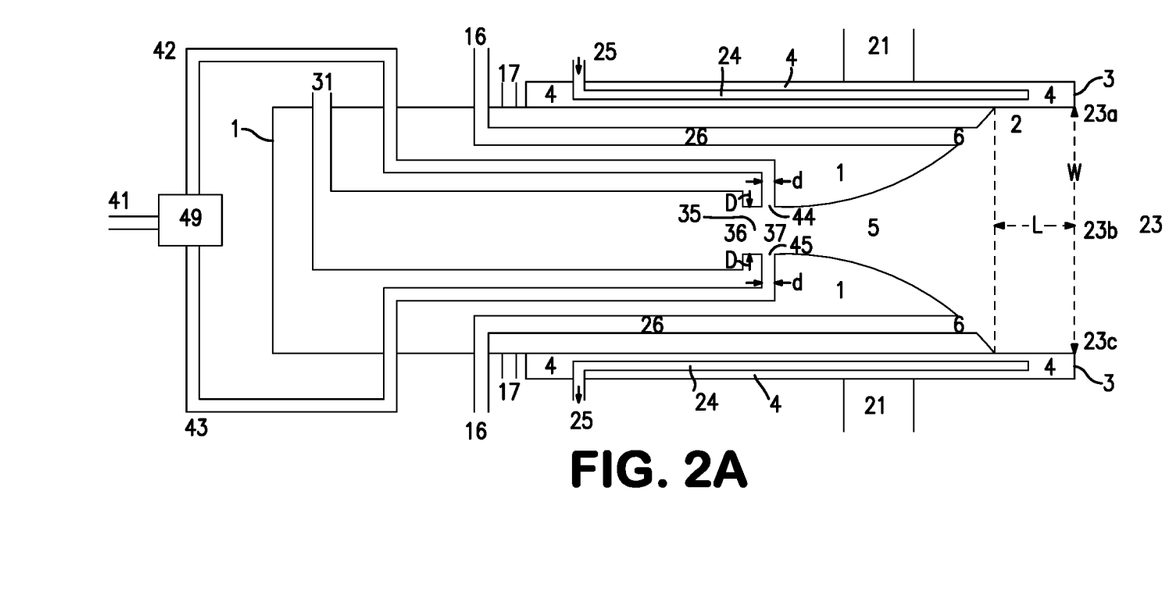
FIG. 2A is a cross-sectional view of a burner viewed in the plane defined by line A-A in FIG. 1.
Figure 2B:
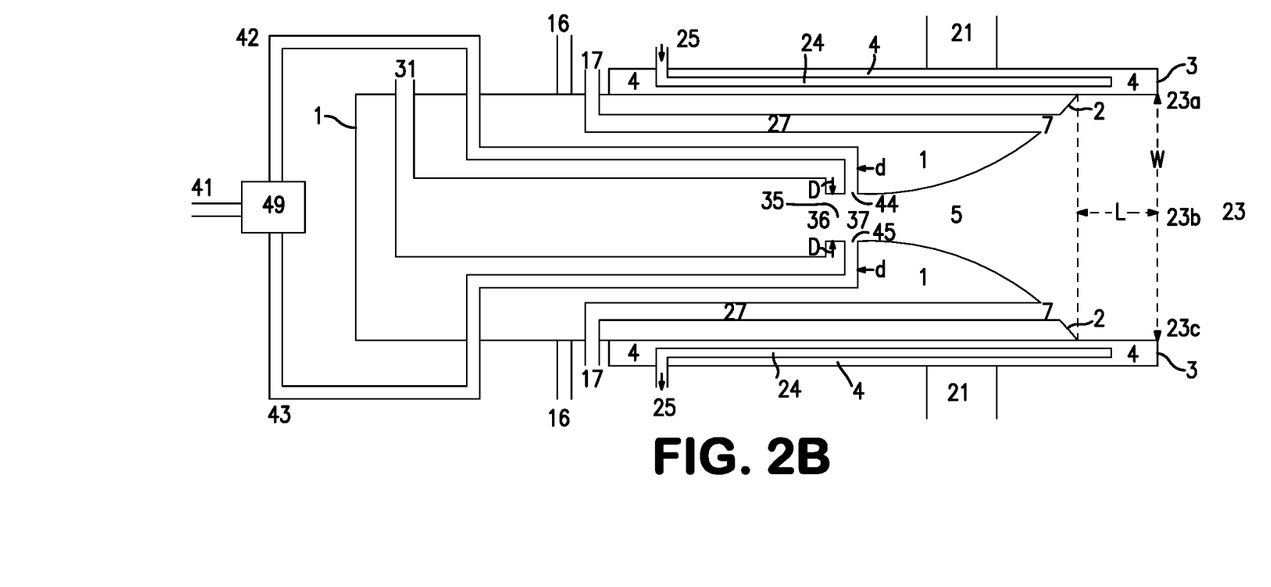
FIG. 2B is a cross-sectional view of a burner viewed in the plane defined by line B-B in FIG. 1.

Referring now to FIGS. 2A and 2B, the burner apparatus of the present invention is shown having been installed through wall 21 of a furnace so that it can provide fuel and oxidant into combustion zone 23 where they are combusted. Fuel is fed in one or more inlets 16 into and through passageways 26 in the body of burner 1, to first ports 6. Oxidant is fed into inlet 31 and passes into fluidic cavity 35 as is described below, and onward into passageway 5 and then out of passageway 5 into combustion zone 23. Stabilizing oxidant is fed in one or more inlets 17 into and through passageways 27 in the body of burner 1, to second ports 7. Housing 4 extends beyond the end of burner 1 by a distance L which is at least 25% of the diameter W across the opening defined by the downstream end of housing 4.

Coolant, such as water, circulates in and out of openings 25 and through coolant passageways 24 which are present in at least the portion of housing 4 that extends in the downstream direction beyond the downstream end of burner 1. The coolant passageways 24 should preferably be distributed uniformly throughout at least that portion of housing 4, to provide more uniform heat absorption. The combination of features in this invention enables combustion operation without encountering excessively high temperatures at the downstream end of burner 1. Preferably, coolant is circulated through coolant passageways 24 at a flow rate that maintains the temperature of no higher than 400 F at the front face of the burner.

The fuel may be any combustible fluid. Examples of preferred fuel include methane and natural gas. Other examples include coke oven gas, syngas, and fuel oil atomized with gas such as air or nitrogen. The oxidant should be gaseous and may have any concentration of oxygen from that of air to that of technically pure oxygen having an oxygen concentration of 99.5 percent or more. The invention will have particular utility with an oxidant having an oxygen concentration of at least 30 percent.

Biasing gas is fed at 41 and passes through valving (represented by 49) and then to two or more supply lines (two of which are shown as 42 and 43) whose outlets (44 and 45, respectively) convey biasing gas into fluidic cavity 35. Biasing gas is supplied into either supply line 42 or supply line 43, or any other supply lines if there are more than two, or is shut off completely, by operation of valving 45. Suitable biasing gas includes any gas or mixture of gases that does not react with the burner unit or with the furnace. Preferred examples include nitrogen, argon, and oxygen, and mixtures of any two or all three thereof, including air and oxygen-enriched air. Oxygen is particularly preferred as a supply of oxygen will already be present for use with this burner, and because the oxygen can participate in the combustion in combustion zone 23.

Figure 3:
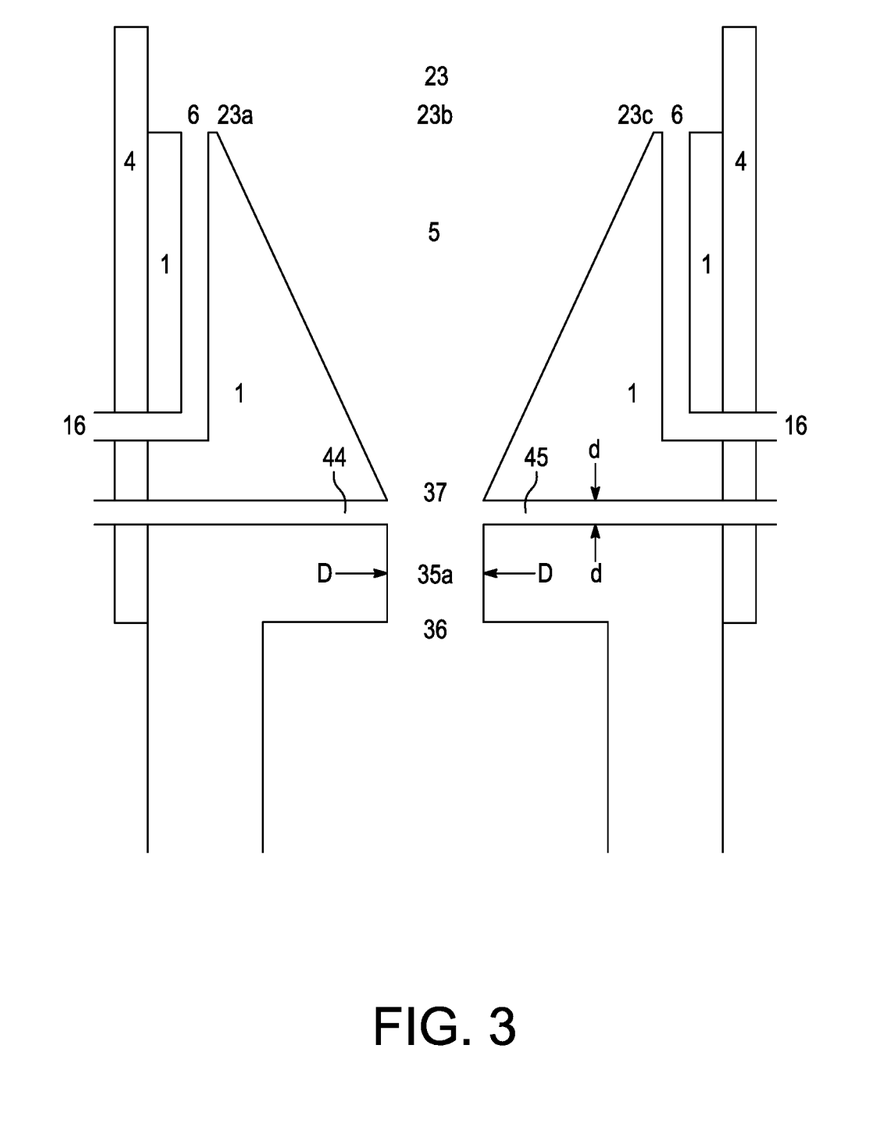
FIG. 3 is a cross-sectional view of a burner apparatus showing additional embodiments of the invention.

FIG. 3 depicts alternative configurations of central passageway 5, and alternative locations of outlets 44 and 45. Referring to FIG. 3, fluidic cavity 35 comprises a restricted flow area 35a which has an inlet 36 and an outlet 37 which communicates directly to the upstream end of passageway 5. In the embodiment of FIG. 3, passageway 5 is conical whereas the embodiment depicted in FIGS. 2A and 2B is flared. In both embodiments, the passageway 5 defines an outwardly expanding cross-sectional area in the downstream direction towards downstream end 2 of burner 1.

In the embodiments of FIGS. 2A, 2B and 3, the restricted flow area that is defined by the fluidic cavity 35 has a diameter D at the point where it communicates with the upstream end of passageway 5. Generally, D will be within the range of from 0.125 to 1.5 inches and typically D will be within the range of from 0.125 to 1.0 inch; however the diameter D will depend upon the firing rate. The biasing gas is provided into the fluidic cavity 35 from a source thereof 41 at a high velocity, generally at a velocity of at least 400 feet per second or even at least 500 feet per second and preferably at sonic velocity or greater preferably up to about 1400 feet per second (or more, even up to 1700 feet per second depending upon the sonic velocity of the oxidant stream being used). At velocities greater than sonic, the velocity is the apparent jet velocity which is defined as the volumetric flow rate, at ambient pressure, leaving an orifice divided by the cross sectional area of the orifice. The high velocity fluid provided into and through the fluidic cavity 35 provides a reduced pressure zone adjacent to the surface at the upstream end of passageway 5.

Typically the invention will inject biasing gas into the gaseous oxidant from only one of outlets 44 and 45 or at least two outlets 44 and 45. Usually the number of such outlets will be within the range of from 2 to 8. The outlets should be oriented so as to supply biasing gas into the fluidic cavity 35 in a direction substantially perpendicular to the flow direction of the oxidant passing through the restricted flow area, i.e., substantially perpendicular to the axial centerline of the fluidic cavity 35 which should also be the axial centerline of central passageway 5.

The outlets 44 and 45 (as well as any additional biasing gas outlets) should have a diameter d where they connect to the fluidic cavity, such that the ratio d/D is within the range of from 0.18 to 0.75, preferably from 0.18 to 0.25. Typically d will be within the range of from 0.10 to 0.15 inch or even up to 0.20 inch. In some situations it may be preferable that the shape of the cross section of the outlets 44 and 45 or the point of communication between the fluidic cavity 35 and the upstream end of passageway 5 would be other than circular. For example, the cross-sectional shape may be elliptical or that of a rectangular slot. In such a case the diameter D and/or d is the smaller of the widths defining the opening.

The biasing gas outlets communicate with the fluidic cavity 35 such that the outlet centers are at a point within the range of from 3d/4 upstream to d/4 downstream of the point of communication between the fluidic cavity 35 and the upstream end of passageway 5. Preferably this range is within the range of from d/2 upstream of the point of communication to the point of communication between the downstream end 37 of fluidic cavity 35 and the upstream end of passageway 5. Most preferably the biasing gas communicates with the fluidic cavity at a point about d/2 upstream of this point of communication. In the embodiment illustrated in FIG. 3, this point of communication is at the point d/2 upstream of the point where the fluidic cavity communicates with upstream end of passageway 5.

Gaseous oxidant and fuel are fed through burner 1, and are combusted in combustion zone 23. The oxidant that passes out of central passageway 5 into combustion zone 23 contains from 50 to 95 volume percent (vol. %) and generally about 60 (+/−5) vol. % of the total oxygen that passes into combustion zone 23. The total amount of oxidant that flows out of all of the second ports 7 contains from 30 to 45 vol. % and generally about 40 (+/−5) vol. % of the total oxygen that passes into combustion zone 23. When biasing gas is injected as described herein, the biasing gas contains 1 to 3 vol. % (preferably 1.5 to 2 vol. %) of the amount of oxidant that passes out of central passageway 5 into the combustion zone 23.

The velocity of the gas (oxidant from inlet 31 plus biasing gas) passing out of the downstream end of central passageway 5 is generally 400 to 1700 feet per second (fps), preferably the narrower range of 900 to 1400 fps. The velocity of the oxidant passing out of the second ports 7 is generally 400 to 1700 feet per second (fps), preferably the narrower range of 900 to 1400 fps. The oxidant passing out of the second ports 7 helps to stabilize and anchor the flame that is formed by the combustion at the burner.

Fuel is passed out of the first ports 6 to be combusted in combustion zone 23. Preferably, the velocity of the fuel passing out of each port is at least 600 fps, which helps avoid the risk of the ports being clogged by any byproducts of premature coking or the like of the fuel, or by any byproducts of the combustion.

The total amount of oxygen passing into combustion zone 23 from passageway 5 (including any biasing oxidant) and from all of the second ports 7 should be 90% to 110% (preferably closer to 100%) of the amount of oxygen needed to completely combust all of the fuel that is fed out of all of the first ports 6 to carbon dioxide and water.

A feature of this invention is the provision of biasing gas substantially perpendicular to the axial centerline of the fluidic cavity to effectively change the flow direction of the main oxidant (that is, the stream of oxidant that is passing through the fluidic cavity and through and out of the central passageway 5). The fluidic cavity 35 helps to achieve the high velocity of the oxidant which in turn causes the generation of a reduced pressure zone. Generally the biasing gas will be provided into the fluidic cavity at or upstream of the transition point 37 where the restricted flow area communicates with the upstream end of central passageway 5. This provision point, as opposed to a more downstream point, enables more efficient flow direction change of a high velocity stream without encountering instability.

The direction of the flow of the main oxidant out of central passageway 5 is controlled by flowing biasing gas through any one of the biasing gas outlets such as 44, 45 shown in FIGS. 2A and 2B. When biasing gas is supplied through a biasing outlet, the main oxidant stream coming through fluidic cavity 35 attaches itself to the inner surface of passageway 5 at about a 10 degree angle opposite the biasing gas stream, and following that inner surface, exits the downstream end of burner 1 at an angle such as about 35 to 40 degrees from the central axis of passageway 5. The combination of the conical and curved cavity enables large angles of deflection for short nozzle lengths. Using this technique the deflection of the main oxidant stream up to an angle of 90 degrees from the central axis has been achieved.

When no biasing gas is provided, the main oxidant proceeds through the fluidic cavity and into combustion zone 23 with no change in direction away from the central axis of passageway 5. However, when biasing gas is provided into the fluidic cavity through, for example, biasing gas outlet 44 or 45, the main oxidant flow is caused to change direction and passes into combustion zone 23 in a direction that diverges from the central axis of passageway 5. This biasing gas flow causes a deflection of the main oxidant flow and causes the main oxidant stream to attach itself to the wall of passageway 5 opposite from where the biasing gas is directed into the main oxidant. This change in direction is believed to be due to a pressure difference caused by the asymmetrical aspiration of fluid into the fluid flow jet because of its proximity to the wall. A free jet, when unobstructed, will entrain the surrounding gas uniformly and expand symmetrically about its axis. However, when placed adjacent to a wall, the entrainment of surrounding gas is limited by the presence of the wall. This creates a low pressure region between the jet and the wall serving to push the fluid flow to conform with the direction of the wall. Generally the pressure difference across the fluid jet will be about 1 pound per square inch (psi) or more for an effective direction change.

The change of direction of the flow of the main oxidant stream is illustrated with reference to FIG. 2A. When no biasing gas is being supplied, the main oxidant stream emerges from central passageway 5 into combustion zone 23 in an axial direction, by which is meant axially aligned with the central axis of passageway 5 and burner 1, toward region 23b. When biasing gas is provided to outlet 44, the main oxidant stream emerges from passageway 5 and out of burner 1 toward region 23c by the action of the injected biasing gas. When biasing gas is provided to outlet 45, the main oxidant stream emerges from passageway 5 and out of burner 1 toward region 23a by the action of the injected biasing gas. The direction of the flow of the main oxidant stream can be changed from axial to being at an angle to axial, and then to a different angle or back to axial. The changes can be intermittent or continual.

In this way the flow direction of the main oxidant stream flowing into combustion zone 23 may be changed without need for adjusting the burner or changing the nozzle. The flow direction may be changed between as many positions as there are biasing gas outlets. The high velocity main oxidant stream, upon exiting the fluidic cavity, will effectively entrain fuel provided into the combustion zone through the second ports 7 or otherwise available in the combustion zone. Thus the fuel and oxidant will flow in the same direction despite the redirection of the main oxidant, and their intermixture during the entrainment will enable stabilized combustion to occur. The combustion is initiated either by an appropriate ignition device or by ongoing combustion within the combustion zone.

Generally the biasing gas will be provided into the fluidic cavity 35 with a flow rate of from 0.5 to 3.0 percent, or even up to 4.0 percent, of that of the main oxidant stream. The velocity of the main oxidant stream may be quite high while still achieving effective changing of direction. Effective changing has been achieved when the main oxidant has an apparent velocity as high as 1400 or even 1700 feet per second (fps) through the fluidic cavity.

In order to achieve effective directional change, the length of the central passageway 5 from the point of its communication with the fluidic cavity to its downstream end must be sufficient to achieve the requisite pressure differential. While the minimum effective length will vary depending on velocity and configuration factors, it has been found that a central passageway length of at least 2D and preferably at least 3D is sufficient to generate the requisite pressure differential and preferably this length is within the range of from 2.5 D to 9 D.

The invention will have increased effectiveness when the angle between the inner surface of passageway 5 and the central axis of passageway 5 is within the range of from 10 to 30 degrees. When passageway 5 comprises surfaces which make more than one angle with the central axis, the relevant angle referred to above is the initial angle at the upstream end of passageway 5.

EXAMPLES

Burners as described herein were made and tested. One burner had a nominal design firing rate of 3 MW and the other had a nominal firing rate of 5 MW. Relevant dimensions of each of these burners are set forth in the following table:

| Firing rate (MW) | Length of central passageway* | Biasing gas passageway diameter d (inches) | Ratio of biasing gas passageway diameter d to D | Number of O2 ports | No. of natural gas ports | Diameter D of restricted flow area (fluidic cavity) (inches) | Number of biasing ports | Total Nozzle length |
|---|---|---|---|---|---|---|---|---|
| 3 | 2D | 0.156 | 0.2 | 8 | 8 | 0.85 | 3-4 | 2D |
| 5 | 3D | 0.188 | 0.18 | 12 | 12 | 0.85 | 3-4 | 3D |

*The length of the central passageway is measured from the point of communication of the central passageway with the fluidic cavity to the downstream end of the central passageway.

The burners were operated at the conditions that are set forth in the following table:

| Burner firing rate | Main O2 (scfh) | Shroud O2 (scfh) | Shroud NG (scfh) | Bias flow (scfh) | Velocity (feet per sec) - Bias flow |
|---|---|---|---|---|---|
| 3 MW | 12240 | 8160 | 10200 | 500 | 660 |
| 5 MW | 20400 | 13600 | 17000 | 500 and greater | 900 |

These burners can be operated at their nominal design firing rates and at firing rates other than the design rate. For example, the 3 MW burner can be operated at 1 MW and 2 MW as well. Considerable deflection of the flow was observed in each burner. The velocity of the bias flow is based on the bias hole diameter.

What is claimed is:

1. A burner apparatus, comprising
(A) a burner body having:
a central passageway within the burner body having an upstream end and an axially opposed downstream end which opens at a downstream end of the burner, wherein the cross-sectional diameter of the central passageway increases in the direction toward the downstream end;
a plurality of first ports in the downstream end of the burner which are located substantially evenly around the downstream end of the central passageway, wherein the first ports are connected by first passageways within the body of the burner to one or more inlets through which a first fluid can be fed,
and a plurality of second ports in the downstream end of the burner which are located substantially evenly around the downstream end of the central passageway, wherein the second ports are connected by second passageways within the body of the burner to one or more inlets through which a second fluid can be fed, the first and second passageways being separate from each other;
wherein the first ports and the second ports are substantially uniformly distant from the central axis of the central passageway;
wherein the plurality of first ports and the plurality of second ports are located in the inner surface of the central passageway upstream from the downstream end of the central passageway;
and wherein the central passageway, the first ports, and the second ports, are the only openings in the burner apparatus through which fluid can flow out of the downstream end of the burner apparatus;
(B) a fluidic cavity communicating at the downstream end thereof with the upstream end of the central passageway of the burner, said fluidic cavity having a diameter D at said point of communication sufficient to enable fluid passing therethrough to have a supersonic velocity, said central passageway having a length from said point of communication to its downstream end of from 2D to 9D;
(C) a plurality of biasing gas passageways through which biasing gas can be fed into the fluidic cavity in a direction substantially perpendicular to the axial centerline of the fluidic cavity, said passageways having a diameter d such that d/D is within the range of from 0.18 to 0.75, said passageways communicating with the fluidic cavity at a point within the range of from 3d/4 upstream to d/4 downstream of the point of communication between the fluidic cavity and the upstream end of the central passageway, where D and d are expressed in the same units;
and (D) a housing which surrounds the downstream end of the burner and which is open at the end of the housing that surrounds the downstream end of the burner, wherein the open end of the housing is located a distance L downstream from the downstream end of the burner, wherein L is at least 25% of the distance across the open end of the housing, wherein the portion of the housing that extends downstream of the downstream end of the burner comprises passageways therein through which coolant can flow to absorb heat generated by combustion occurring at the burner.

2. The burner apparatus of claim 1 wherein the biasing gas outlets are positioned to provide biasing gas into the fluidic cavity at or upstream of the point of communication between the fluidic cavity and the upstream end of the central passageway.

3. The burner apparatus of claim 2 wherein the number of biasing gas outlets is 2 to 8.

4. The burner apparatus of claim 1 wherein d/D is within 0.18 to 0.25.

5. The burner apparatus of claim 1 wherein the surface of the central passageway forms an angle of 10 to 30 degrees with its central axis.

6. The burner apparatus of claim 1 wherein said central passageway has a length from said point of communication to its downstream end of from 3D to 9D.

7. The burner apparatus of claim 6 wherein the central passageway has an inner surface which is curved.

8. The burner apparatus of claim 6 wherein the central passageway has an inner surface which is conical.

9. The burner apparatus of claim 6 wherein the biasing gas outlets are positioned to provide biasing gas into the fluidic cavity at or upstream of the point of communication between the fluidic cavity and the upstream end of the central passageway.

10. The burner apparatus of claim 6 wherein d/D is within 0.18 to 0.25.

11. The burner apparatus of claim 6 wherein the surface of the central passageway forms an angle of 10 to 30 degrees with its central axis.

12. A method of combustion, comprising:
(A) feeding fuel out of the downstream end of a burner according to claim 1 through the first ports of the burner;
(B) feeding gaseous oxidant out of the downstream end of the burner through the second ports of the burner;
(C) feeding gaseous oxidant through the fluidic cavity of the aforesaid burner and through and out of the downstream end of the central passageway of the burner, wherein the gaseous oxidant flows through the fluidic cavity at a velocity of at least 400 feet per second to establish a reduced pressure zone adjacent a portion of the surface of the central passageway;
(D) combusting the fuel and the gaseous oxidant; and
(E) periodically or continually, injecting a stream of biasing gas having a diameter d into the fluidic cavity in a direction substantially perpendicular to the flow direction of the gaseous oxidant passing through the fluidic cavity at a point within the range of from 3d/4 upstream to d/4 downstream of the point of communication between the fluidic cavity and the central passageway, where D and d are measured in the same units, thereby changing the flow direction of the gaseous oxidant passing out of the downstream end of the central passageway.

13. The method of claim 12 wherein the biasing gas comprises oxygen.

14. The method of claim 12 wherein the flow rate of the biasing gas is 0.5 to 4.0 percent of the flow rate of the oxidant through the central passageway.

15. The method of claim 12 wherein the biasing gas is injected into the fluidic cavity at or upstream of the point of communication between the restricted flow area and the upstream end of the central passageway.

16. The method of claim 12 wherein the gaseous oxidant flows through the fluidic cavity at a velocity of at least 500 feet per second to establish a reduced pressure zone adjacent a portion of the surface of the central passageway.

17. The method of claim 16 wherein the biasing gas comprises oxygen.

18. The method of claim 16 wherein the flow rate of the biasing gas is 0.5 to 3.0 percent of the flow rate of the oxidant through the central passageway.

19. The method of claim 16 wherein the biasing gas is injected into the fluidic cavity at or upstream of the point of communication between the restricted flow area and the upstream end of the central passageway.

20. The burner apparatus of claim 1 wherein the central passageway has an inner surface which is curved.

* * * * *